March 20, 1928.
J. L. HECHT
WHEEL HUB
1,663,127
Filed May 26, 1922
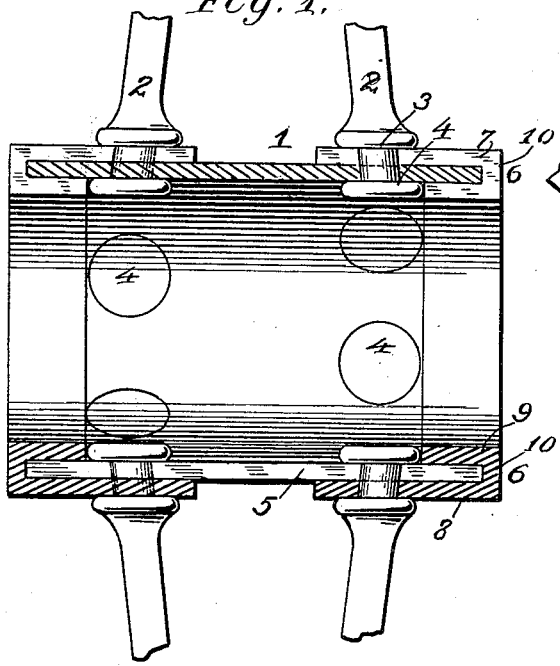
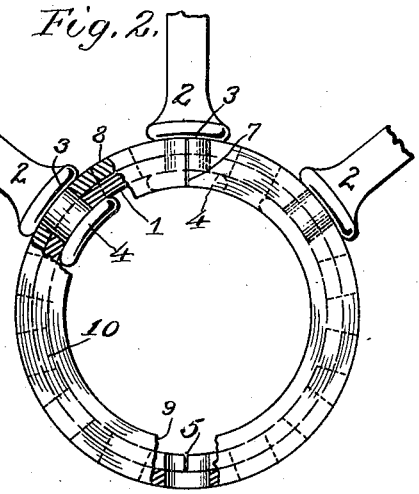
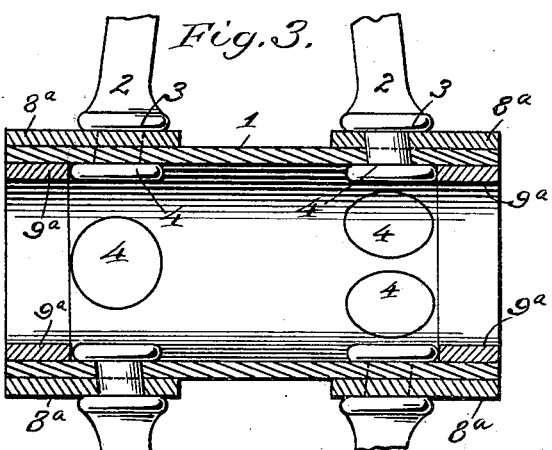
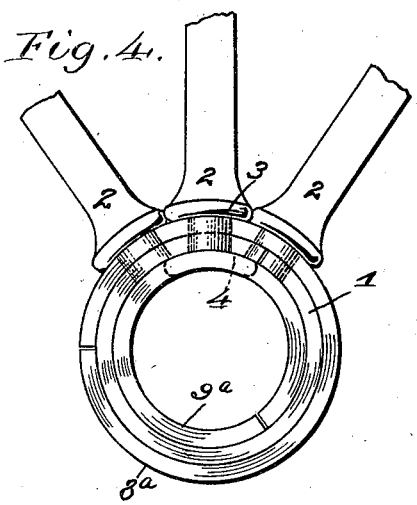
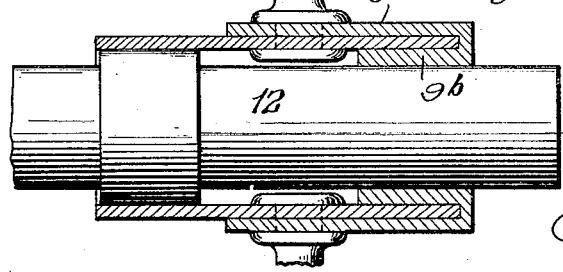
Inventor
J. L. Hecht
by Rogers, Kennedy Campbell
Attys Patented Mar. 20, 1928.

1,663,127

UNITED STATES PATENT OFFICE.

JOSEPH L. HECHT, OF DAVENPORT, IOWA, ASSIGNOR, BY MESNE ASSIGNMENTS, TO FRENCH & HECHT, INC., OF DAVENPORT, IOWA, A CORPORATION OF IOWA.

WHEEL HUB.

Application filed May 26, 1922. Serial No. 563,308.

This invention relates to wheel hubs in the form of a hollow cylindrical metal shell having the spokes fastened thereto by the formation of heads on the inner ends of the spokes inside the shell, and one of the objects of the invention is to maintain the cylindrical form of the hub shell when it is made from a sheet or plate bent into a cylindrical form with the meeting edges of the bent plate abutting. Another object of the invention is to provide for the ready insertion and effectual support of an axle or bearing box within the hub shell, notwithstanding the projection of the spoke heads inwardly beyond the internal surface of the shell.

With these and other objects in view, my invention consists of the improved features of construction and form of the parts shown in the accompanying drawings, and which will be fully described in the specification to follow, and the novel parts thereof set forth in the appended claims.

In the accompanying drawings:

Fig. 1 is a longitudinal sectional elevation of a hub and connected spokes, having my invention embodied therein in one form.

Fig. 2 is an end elevation of the same, with parts broken away to expose other parts to view.

Fig. 3 is a view similar to Fig. 1 showing a modified form of the invention.

Fig. 4 is an end elevation of the same.

Fig. 5 is a longitudinal sectional elevation of a hub shell and connected spokes, showing how the invention may be carried out with an internal bearing sleeve at one end only of the hub.

Referring to the drawings:

1 designates a hub shell of tubular or hollow cylindrical form, and 2 designates spokes, in the present instance arranged in two rows or ranks and fastened at their inner ends to the shell by means of shoulders 3 on the spokes exterior of the hub, and heads 4 on the inner ends of the spokes on the interior of the hub.

The hub shell in the present instance is made from a flat metal plate or sheet which is bent by appropriate means into cylindrical form, and has its two edges abutting as shown at 5 in Fig. 2. To preserve the bent cylindrical form of the hub shell I provide two channel rings or caps 6 which are shown as slitted longitudinally as at 7, Fig. 2, and which are fitted over the opposite ends of the hub shell, with said ends extending in the channels of the rings. Each channeled ring comprises an outer sleeve or cylindrical part 8, and an inner sleeve or cylindrical portion 9 considerably narrower than the outer sleeve, which sleeves are connected together at the outer ends by an annular connecting portion 10 which maintains the sleeves spaced from each other circumferentially so as to form the channel therein. The spokes extend through the outer sleeves of the rings and through the hub shell, and the shoulders 3 on the spokes bear against the outer sides of the sleeves 8, and the heads 4 on the inner ends of the spokes bear against the inner sides of the hub shell, whereby the rings are firmly and rigidly connected with the shell at its two ends, and the parts are prevented from separating at their abutting edges, and their true and proper cylindrical form is preserved. The internal sleeves 9 of the rings are disposed outwardly axially of the heads on the inner ends of the spokes, and are of a thickness which will bring their inner surfaces flush with or radially inward of the inner surfaces of the spoke heads, whereby a box or axle may be inserted into the hub shell without interference with the projecting spoke heads; and the sleeves will serve as bearing surfaces at widely separated points, for the box or axle at the opposite ends of the hub.

In so far as the provision of the inner end sleeves 9 serving as bearings for the box or axle is concerned, the hub shell may be formed from the section of tubing, or it may be bent up from a flat sheet or blank and its meeting edges be welded together to preserve its cylindrical form; and instead of dependence being placed entirely on the connection of the channeled rings with the hub shell through the medium of the spokes as described, the rings and hub shell may be spot welded to each other at intervals.

In Figs. 3 and 4 the invention is shown in slightly modified form. Here it will be seen that the external and internal sleeves 8ª and 9ª characteristic of the channeled ring of Fig. 1, are disconnected from each other, the sleeves 8ª terminating at their outer ends flush with the outer ends of the hub shell, and the internal sleeves 9ª likewise terminating at their outer ends flush with the outer ends of the shell and the outer ends of the sleeve 8ª. The function of the external sleeves is similar however to those first described, in that when fastened to the hub shell by the spokes or otherwise, the cylindrical form of the parts will be maintained; and the function of the internal sleeves is similar to those first described in that they serve as bearings for the box or axle inserted in the hub shell, and enable the same to be inserted without obstruction by the projecting spoke heads. In this instance, as described in connection with the construction of Fig. 1, the hub shell may be made from a section of tubing, or it may be bent up from a flat sheet or blank and its abutting edges may be welded together, and the sleeves may be fastened to the parts they surround by spot welding.

In the embodiments of the invention so far described, bearing sleeves for the box are provided, one at each end of the hub shell, the box thus receiving support at its opposite ends directly from said bearing sleeves. The invention may however be carried out in a construction where but a single bearing sleeve $9^b$, as shown in Fig. 5, is provided in the outer end of the hub shell, which sleeve is connected at its outer end to an external sleeve $8^b$ surrounding the hub shell. The inner ends of the spokes are extended through the external sleeve $8^b$ and the hub shell and are riveted thereto similar to the connection of the spokes with the sleeves shown in Fig. 1. In this construction the box 12 will receive support at its outer end from the internal sleeve, and will receive support at its inner end directly from the interior of the hub shell.

The arrangement of the parts and their connection as described, produces a solid, rigid hub structure with the parts firmly and strongly connected together without danger of the abutting edges of the cylindrical parts separating or becoming displaced.

By reason of the provision of the internal bearing sleeves for the box disposed as hereinbefore described, I am enabled to provide room in the interior of the hub shell between the outer surface of the box and interior of the hub shell, for the spoke heads on the inner ends of the spokes, without specially grooving or forming the hub shell, as has been heretofore practiced, to provide spoke chambers for such heads. As a result I am enabled to employ flat commercial plates or sheets bent up into cylindrical form, or commercial pipe sections for the hub shells, since by the provision of the internal sleeves inserted either in one or both ends of the shell, space is afforded between the exterior of the box and the interior of the shell to serve as spoke chambers for the spoke heads, and at the same time a firm and rigid support is afforded the bearing box either at one or both ends as the case may be. By utilizing commercial forms of metal in thus constructing the hub shells, a great saving in expense of handling and shaping operations is effected, and a structure is produced in which the parts are rigidly and firmly connected together in the form of a practically integral unitary structure.

The present construction is to be distinguished from that of the Einfeldt Patent No. 1,327,227 wherein the spoke chambers are provided by forming holes or sockets in the inner layer of a hub shell formed of several thicknesses of sheet metal or plate, all of which layers extend throughout the length of the hub shell; and the construction is also to be distinguished from my previous Patent No. 1,409,174 in which the hub shell is specially grooved to form the spoke chambers to receive the spoke heads.

While in the foregoing description and accompanying drawings I have set forth my invention in the particular detailed form and construction of the parts which I prefer to adopt, it is manifest that these details may be variously changed and modified without departing from the spirits of the invention; and further it will be understood that the invention is not limited to any particular form or construction of the parts except in so far as such limitations are specified in the claims.

Having thus described my invention, what I claim is:

1. In combination with a hub shell, spokes fastened thereto and formed on their inner ends inside the shell with fastening heads projecting beyond the interior surface of the shell, and a comparatively narrow sleeve seated in the hub shell between the end of the same and said spoke heads and serving as a bearing for a box or axle.

2. In combination with a hub shell, two ranks of spokes fastened thereto and formed on their inner ends inside the shell with fastening heads projecting beyond the interior surface of the shell, and two comparatively narrow sleeves independent of each other and seated in the hub shell respectively between the outer ends of the same and the adjacent spoke heads, the inner surfaces of said sleeves being in a position which will prevent interference by the spoke heads to the insertion of a box or axle, and said sleeves serving as bearings for the opposite ends of a box or axle.

3. In combination with a hub shell, an external sleeve surrounding the same, spokes extending through the sleeve and shell and fastening said parts together, said spokes being provided at their inner ends with fastening heads disposed on the interior of the shell, and an internal sleeve seated in the end of the shell and connected at its outer end to the outer end of the external sleeve, said internal sleeve serving as a bearing for a box or axle.

4. In combination with a longitudinally slitted hub shell, two external sleeves surrounding the shell respectively at its ends, and two internal sleeves independently of each other connected at their outer ends with the outer ends of the external sleeves respectively and seated in the end of the shell, and two rows or ranks of spokes extending through the external sleeves and hub shell and fastening said parts together, said spokes having heads on their inner ends disposed respectively inward axially of the internal sleeves, and said internal sleeves serving as bearings for a box or axle.

5. In combination with a hub shell, channeled rings applied respectively to the ends of the shell and comprising each an outer sleeve surrounding the shell and an inner sleeve extending within the same, and spokes extending through the outer sleeves and through the shell and serving to fasten said parts together, the said inner sleeves serving as bearings for a box or axle.

6. In combination with a hub shell, channeled rings applied respectively to the ends of the same and comprising each an outer sleeve surrounding the shell and a relatively narrower inner sleeve extending within the same, spokes extending through the outer sleeves and through the hub shell and fastening said parts together, and heads on the inner ends of the spokes disposed inward of the inner ends of the inner sleeves, said inner sleeves serving as bearings for a box or axle.

7. In a hub structure, a tubular hub shell, caps for the ends of said shell, said caps having cylindrical parts overlying the end portions of the shell and other cylindrical portions of lesser diameter integral with the first adapted to receive an axle box, the overlapping portions of the shell and cap being provided with spoke holes, and spokes extending through both parts and headed within the shell; whereby the spokes hold the caps and shell together and the heads of the spokes are clear of the said axle box when the same is inserted.

In testimony whereof, I have affixed my signature hereto.

JOSEPH L. HECHT.